(12) United States Patent
Yim

(10) Patent No.: US 7,264,289 B2
(45) Date of Patent: Sep. 4, 2007

(54) ARTICULATED ROBOTIC SERIAL MECHANISM AND METHOD

(75) Inventor: Mark H. Yim, Radnor, PA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 125 days.

(21) Appl. No.: 11/210,853

(22) Filed: Aug. 25, 2005

(65) Prior Publication Data

US 2006/0131907 A1    Jun. 22, 2006

Related U.S. Application Data

(60) Provisional application No. 60/636,533, filed on Dec. 17, 2004.

(51) Int. Cl.
*B25J 15/00*    (2006.01)
*B25J 15/10*    (2006.01)

(52) U.S. Cl. ..................... 294/106; 294/111; 901/36; 901/39

(58) Field of Classification Search ............... 294/1.1, 294/86.4, 106, 111; 901/14, 15, 39, 36; 623/63, 623/64

See application file for complete search history.

(56) References Cited

U.S. PATENT DOCUMENTS

| | | | | |
|---|---|---|---|---|
| 2,545,452 A | * | 3/1951 | Fletcher | 623/64 |
| 4,367,891 A | * | 1/1983 | Wauer et al. | 294/88 |
| 4,784,042 A | * | 11/1988 | Paynter | 91/534 |
| 5,318,331 A | * | 6/1994 | Tozuka | 294/88 |
| 5,326,369 A | * | 7/1994 | Schectman | 623/24 |
| 6,413,229 B1 | | 7/2002 | Kramer et al. | |
| 6,432,112 B2 | | 8/2002 | Brock et al. | |
| 6,593,907 B1 | | 7/2003 | Demers et al. | |
| 6,817,641 B1 | * | 11/2004 | Singleton, Jr. | 294/106 |

* cited by examiner

*Primary Examiner*—Dean J Kramer
(74) *Attorney, Agent, or Firm*—Oliff & Berridge, PLC

(57) ABSTRACT

A robotic device may include a plurality of concatenated assemblies, a tendon slidably connected to the plurality of concatenated assemblies, and an actuator that moves the tendon. Each assembly of the concatenated plurality may include a joining member that neighbors an adjacent assembly, a linkage that may fixedly connect to the joining member and may pivotably connect to the adjacent assembly, and an appendage that may extend from the joining member to a length. The appendage may include a connector through which the tendon may be connected to slide through. The connector may be adjustably disposable along the length of the appendage to a specified position thereon. The appendage may extend in a direction at a specified angle relative to the linkage.

17 Claims, 4 Drawing Sheets

ARTICULATED ROBOTIC SERIAL MECHANISM AND METHOD

This nonprovisional application claims the benefits of U.S. Provisional Application No. 60/636,533, filed Dec. 17, 2004. The entire disclosure of the prior application is incorporated herein by reference in its entirety.

BACKGROUND

This invention relates to an articulated robotic serial mechanism.

Highly articulated snake-like robots may be formed from several concatenated segments having connection interfaces. Such "snake-bots" typically require many actuators to move the robot in a desired manner. These actuators may include motors that supply the force for moving the segments.

The distribution of the motors along the segments, provide an even weight distribution. However, because the motors form comparatively massive components, a plurality of actuators (especially motors) produces a heavy and slow robot that is inhibited from executing actions that require the robot to lift much of itself against gravity.

For snake-like arms, heavy actuators may be disposed at a base of the arm, with separate tendons or cables connected to each joint for transmitting forces. While such an arrangement facilitate lighter-weight arms, particularly for fixed structures, total weight considerations render them impractical for mobile robots. Examples of tendon-driven robot arms include U.S. Pat. Nos. 6,593,907, 6,413,229 and 6,432,112, each of which is incorporated by reference in its entirety.

SUMMARY

Various exemplary embodiments provide a robotic device that includes a plurality of concatenated assemblies, a tendon slidably connected to the plurality of concatenated assemblies, and an actuator that moves (e.g., pulls) the tendon. Each assembly of the concatenated plurality may include a joining member that neighbors an adjacent assembly, a linkage that fixedly connects to the joining member and pivotably connects to the adjacent assembly, and an appendage that connects to the tendon and extends from the joining member along a lateral direction at a specified angle to the linkage. The appendage may extend in a direction at a specified angle relative to the linkage. The appendage may include a connector through which the tendon may be slidably connected for at least one of the assemblies.

In various exemplary embodiments the appendage may extend linearly from the joining member. The connector may be positioned manually or by an auxiliary actuator. Alternatively, the appendage may extend radially from the joint to form a rim of the appendage having a variable outer radius from the joint. A variable lateral distance between the joining member and the connector for separate assemblies may enable variable moments to be exerted for the same tensile load through the tendon.

BRIEF DESCRIPTION OF THE DRAWINGS

Various exemplary details are described below with reference to the following figures, wherein.

DETAILED DESCRIPTION OF EXEMPLARY EMBODIMENTS

The following detailed description refers to a tendon-driven robot. The robot may refer to any automatic assembly, for example, articulated arms, for sake of clarity and familiarity. However, it should be appreciated that the principles described herein may be equally applied to any known or later-developed robots, beyond the examples specifically discussed herein.

Figure 1:
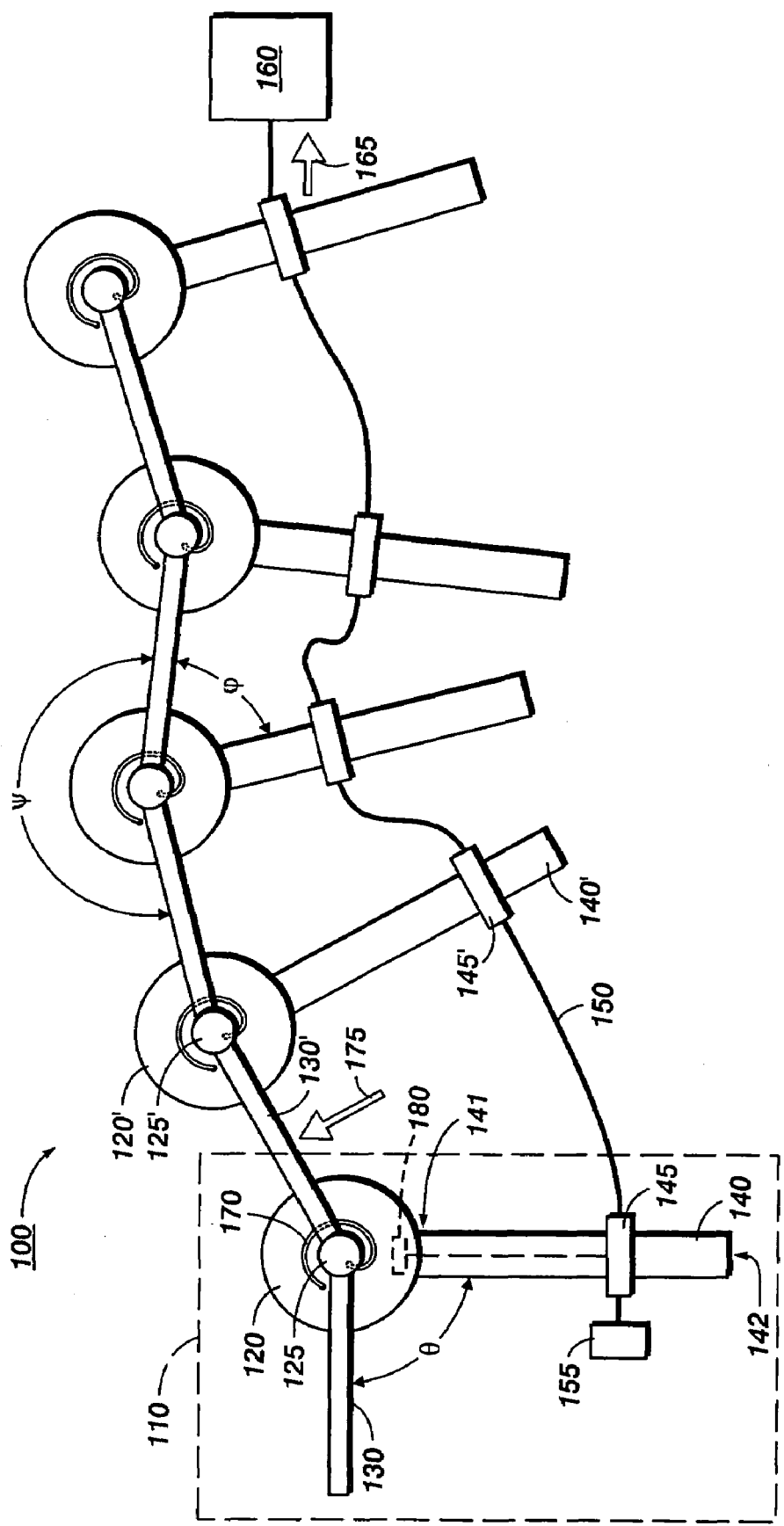
FIG. 1 shows an exemplary tendon-driven arm having linearly adjustable moment members in a first embodiment.

FIG. 1 shows an exemplary robot arm 100 having a plurality of concatenated assemblies 110. In the example illustrated, a series of five such assemblies 110 are provided. The assembly 110 may include a joining member or joint 120 having a center 125, a linkage 130 that connects the center 125 of the joint 120 with an adjacent joint 120', and a linearly adjustable moment member or appendage 140 appended from the joint 120. To facilitate its movement, the appendage 140 may be less massive than the joint 120. Each assembly 110 may have the same, similar or different components, with linkages and appendages of extending the same or different lengths as compared to their adjacent neighbors.

The assembly 110 may dispose the linkage 130 and the appendage 140 at a specified angle $\theta$, e.g., fixed at 90°, as shown. However, the connection between the appendage 140 and an adjacent linkage 130' may pivot, such that an angle $\phi$ between the appendage 140 and the adjacent linkage 130' may be varied (typically within the same plane as $\theta$) upon application of an appropriate force. Alternatively, this relationship can be expressed as an angle $\psi$ at the joint 120 between the linkage 130 and the adjacent linkage 130'.

The appendage 140 may extend rigidly from a root 141 to a tip 142, and may include an adjustable connector 145 therebetween. This may provide a variable distance between the joint 120 and the connector 145 for each assembly 110 that enables variable moments to be exerted for the same tensile load through a tendon 150, described below.

The root 141 may connect the appendage 140 to the joint 120. The tip 142 may provide a surface with which to articulate an object to be manipulated by the robot. The tendon 150 may be slidably attached to the connector 145 to provide a moment (force times distance) to be applied to the linkage 120 by tensioning the tendon 150. The connector 145 may be positioned along the length of the appendage 140 to enable the distance between the center 125 and the connector 145 to be varied as desired. The tendon 150 may terminate at an end 155, which may be attached to the connector 145 of one of the concatenated assemblies and/or fixed to an alternate location relative to the robot arm 100.

A tendon motor or actuator 160 may controllably apply a tensile force 165 to the tendon 150, thereby pulling the tendon 150, in response to a command signal. This force 165 may enable the angle $\psi$ at the joint 120 to be reduced. A coil spring 170 may provide a counteracting torsional force 175 between the appendage 140 and the adjacent linkage 130' in order to return them to a default or preload angular position.

The connector 145 may be disposed at a specified distance from the center 125 either by manual adjustment or by an auxiliary actuator 180 that may be located at the joint 120, or at separate location and connected to the connector 145 by cables (not shown). Alternatively, the connector 145 may be fixed in position relative to the appendage 140. The moment depends on the distance between the center 125 at the joint 120 and the connector 145 through which the tendon 150 attaches to the appendage 140. The distance between the center 125 and the connector 145 may be independent of the corresponding distance between an adjacent center 125' and an adjacent connector 145' on the adjacent appendage 140'.

Figure 2A:
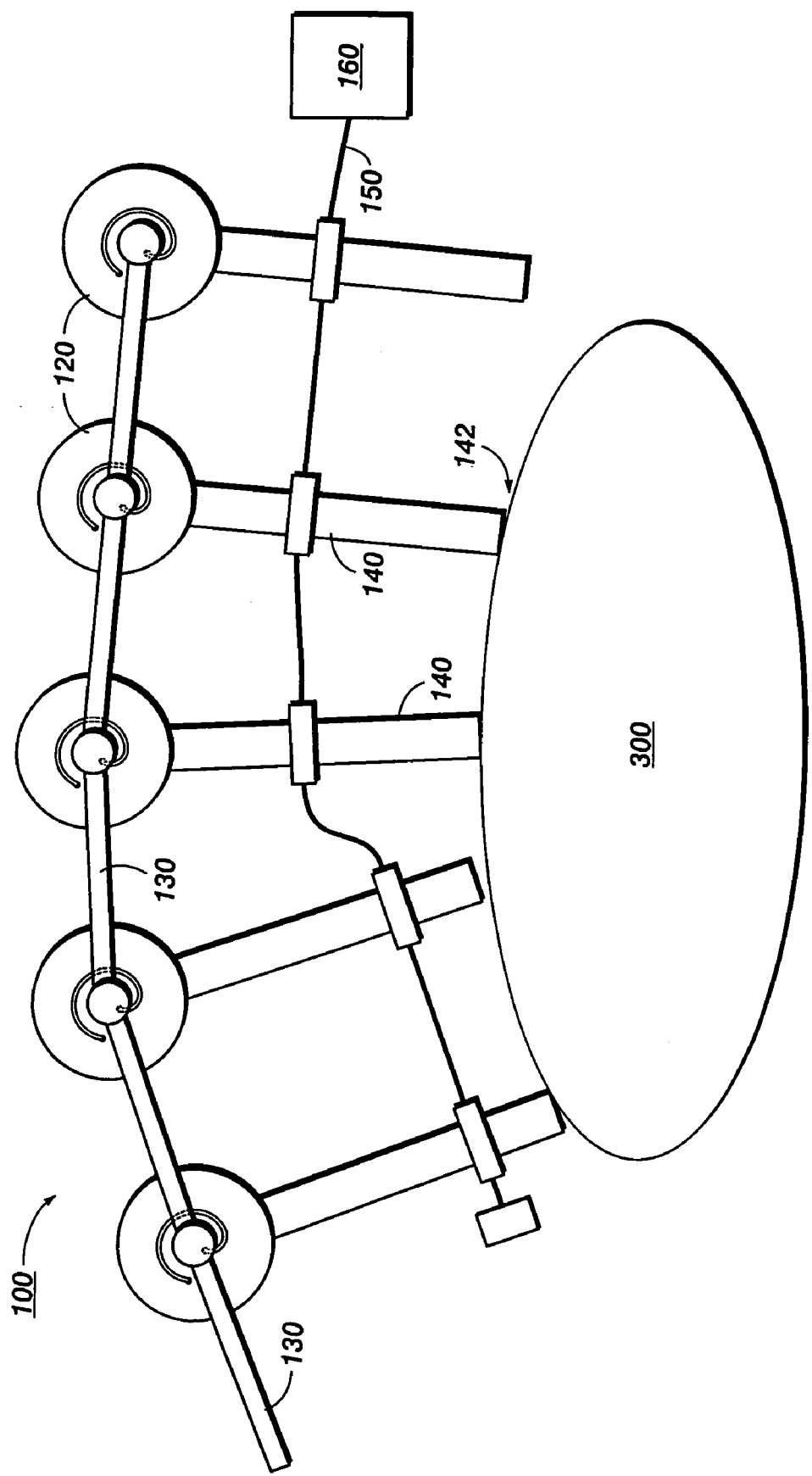
FIG. 2A shows an exemplary tendon-driven arm of FIG. 1 before executing an exemplary operation tendon-driven arm.
Figure 2B:
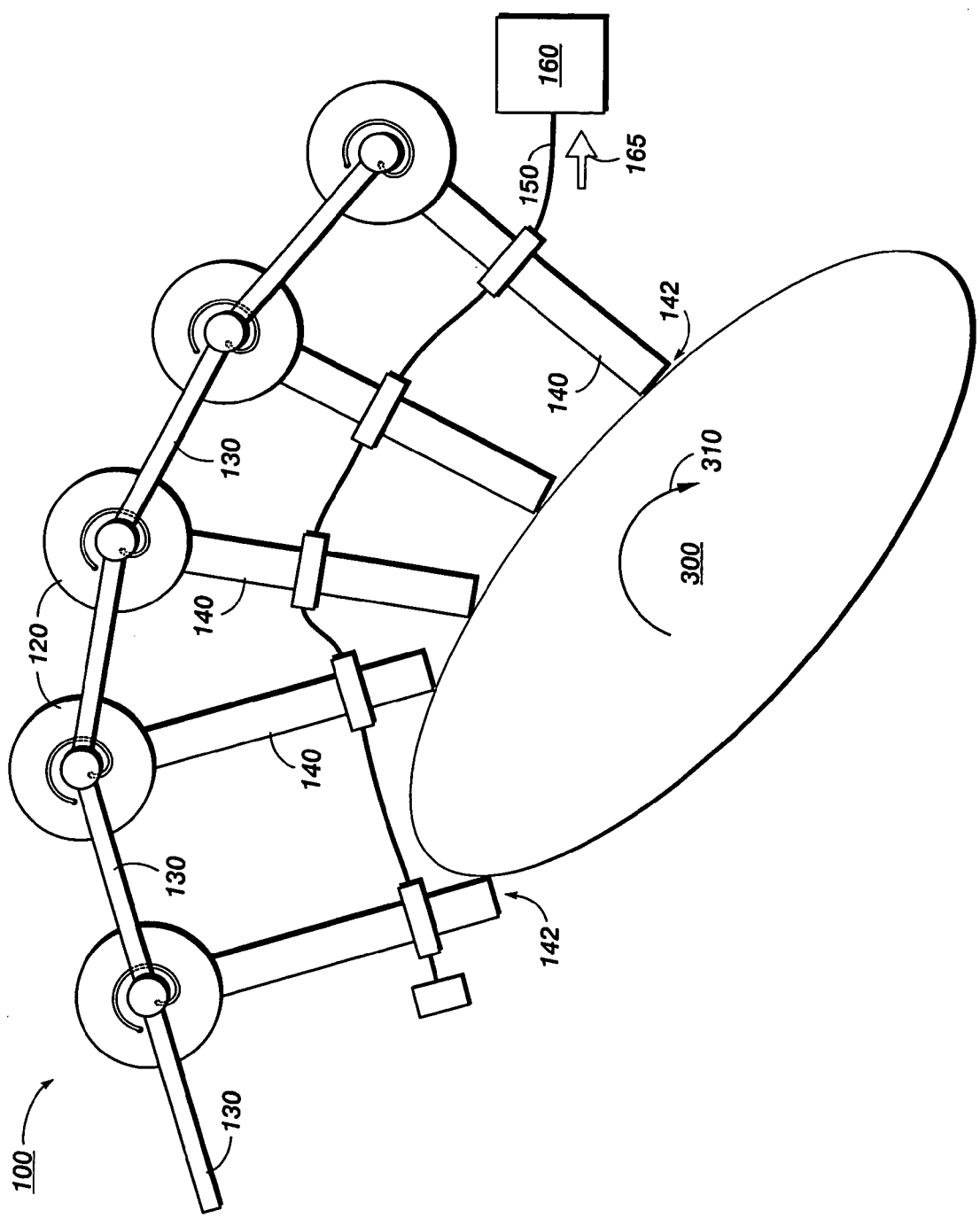
FIG. 2B shows an exemplary tendon-driven arm of FIG. 1 after executing an exemplary operation tendon-driven arm.

FIGS. 2A and 2B show an example of an object 300 (shown as an oval tape dispenser) being manipulated by the robot arm 100 to turn in an arc direction 310 from a first orientation or position to a second orientation or position by the robot arm 100 during actuation. The appendages 140 may be positioned to engage, by their respective tips 142, the object 300 at the first position.

Prior to actuation, the joints 120 (relative to their adjacent linkages) and the tendon 150 may be relaxed or in minor tension from the tendon motor 160, as shown in FIG. 2A. Upon actuation, the motor 160 may pull the tendon 150 taut so that the joints 120 and linkages 130 are translated and rotated (relative to their adjacent linkages), as shown in FIG. 2B.

This movement produced by tension in the tendon 150 enables the tips 142 of the appendages 140 to apply force to push against the object 300 to the second position. Those having skill in the art will recognize that the joints, linkages, appendages and connectors shown are exemplary and may encompass arbitrary shapes within the scope of the invention. These forces from the tips 142 may conform to engage various shapes of object 300 naturally, without explicit commands to each joint 120.

Figure 3:
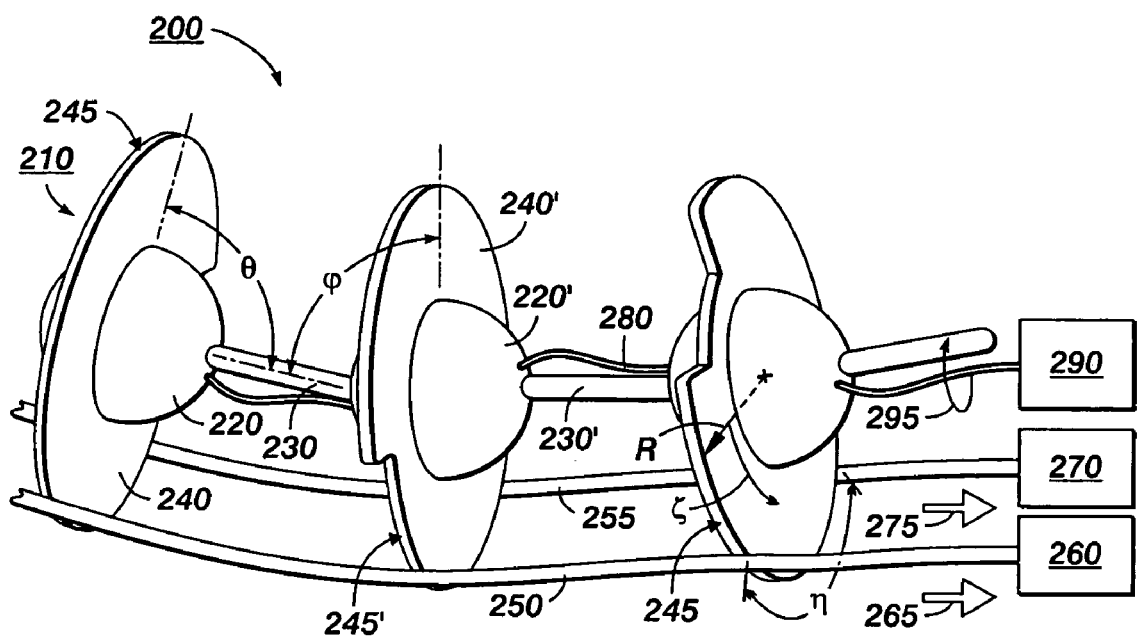
FIG. 3 shows an exemplary tendon-driven arm having rotatable moment members in a second embodiment.

FIG. 3 shows another exemplary robot arm 200 having a plurality of concatenated assemblies 210. The assembly 210 may include a ball (or universal) joint 220, a linkage 230 that connects the ball joint 220 with an adjacent ball joint 220', and a rotatable cam member 240 extending from the joint 220. The assembly 210 may angularly dispose the linkage 230 and the cam member 240 at a specified joining angle $\theta$, e.g., fixed at 90°, as shown. A linking angle $\phi$ between an adjacent cam member 240' and the linkage 230 may be varied upon application of appropriate force. A countervailing force between the adjacent cam member 240' and the linkage 230 may be provided to return them to a default or preload angular position.

A rim or periphery 245 of the cam member 240 exhibits a radial profile having radius R that may vary angularly with a cam angle $\zeta$ around the cam circumference as a radial function $R(\zeta)$. The rim 245 may have a similar or different radial profile than an adjacent rim 245' of the adjacent cam member 240'. The rim 245 may serve to interface with an object to be manipulated. The radial distance between the rim 245 and the ball joint 220 may vary depending on the angular orientation of the cam member 240.

A first tendon 250 may connect or attach to the rim 245 by a follower (not shown, but for example a clip connected to the ball joint 220) that enables the first tendon 250 to glide along the rim 245 as the cam member 240 rotates. A second tendon 255 may also connect to the rim 245 by another follower (not shown). The optional second tendon 255 may provide an additional degree of freedom for flexing the cam members 240, and thereby enable the linking angle $\phi$ to vary with the cam angle $\zeta$ as an angular function $\phi(\zeta)$.

The first and second tendons 250, 255 may be angularly separated from each other by a displacement angle $\eta$. In the example shown, the angular separation for displacement angle $\eta$ may be substantially perpendicular. Alternatively, a larger plurality of tendons may be employed to provide a greater number of degrees of freedom with specified or variable relative angles of separation.

A first tendon motor 260 may apply a first tensile force 265 to the first tendon 250. A second tendon motor 270 may apply a second tensile force 275 to the second tendon 255. These first and second tensile forces 265, 275 applied to the first and second tendons 250, 255 may enable the rim 245 of the cam member 240 to be brought in greater proximity to the rim of an adjacent cam member 240' by changing the linking angle $\phi$.

A flexible transmission cable 280 may connect the cam member 240 and may pass through the ball joint 220. A cam motor 290 may connect at one end of the transmission cable 280 to provide torsional force 295 to rotate the cam member 240. The angular position of the cam member 240 may orient the rim 245 to produce controlled radial distances between the ball joint 220 and the first and second tendons 250, 255.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A robotic device comprising:
    a plurality of concatenated assemblies, each assembly including:
        a joining member that neighbors an adjacent assembly;
        a linkage that fixedly connects to the joining member and pivotably connects to the adjacent assembly;
        an appendage that extends from the joining member along at least a lateral direction having a specified angle to the linkage, wherein the appendage includes a connector that is adjustably disposable along the at least one lateral direction of the appendage to a position thereon;
    a tendon that slidably connects to at least one connector corresponding to the at least one appendage of the plurality of concatenated assemblies to form a connection; and
    an actuator that pulls the tendon in response to a command.

2. The robotic device, according to claim 1, wherein the position of the connector along the at least one lateral direction of the appendage is adjustable by an auxiliary actuator.

3. The robotic device, according to claim 2, wherein the auxiliary actuator laterally translates the connector along the at least one lateral direction of the appendage between a root that attaches the appendage to the joining member and an opposite end of the appendage.

4. The robotic device, according to claim 1, further comprising:
    a torsion actuator that rotates the appendage, wherein the appendage extends radially around the joining member to form a rim having a radius from the joining member, the radius of the rim varying angularly along the at least one lateral direction of the appendage.

5. The robotic device, according to claim 4, further comprising:
an auxiliary tendon that slidably connects to at least one connector of the plurality of concatenated assemblies to form a connection, the auxiliary tendon being angularly separated along the rim from the tendon; and
an auxiliary actuator that pulls the auxiliary tendon in response to an auxiliary command.

6. The robotic device, according to claim 1, wherein a linkage angle between the linkage and an adjacent linkage of the adjacent assembly is established absent the command to the actuator.

7. A robotic device comprising:
first and second assemblies, the first assembly including:
a first joining member that neighbors the second assembly;
a first linkage that fixedly connects to the first joining member and pivotably connects to the second assembly;
a first appendage that extends from the first joining member along a first lateral direction having an angle to the first linkage, wherein the first appendage includes a first connector that is adjustably disposable along the first lateral direction of the appendage to a first position thereon,
the second assembly including:
a second appendage that extends from a second joining member along a second lateral direction, wherein the second appendage includes a second connector that is adjustably disposable along the second lateral direction of the appendage to a second position thereon;
a tendon slidably connected to the first connector and the second connector; and
an actuator that pulls the tendon in response to a command.

8. The robotic device, according to claim 7, wherein the position of the first connector along the first lateral direction of the first appendage is adjustable by an auxiliary actuator.

9. The robotic device, according to claim 8, wherein the auxiliary actuator laterally translates the first connector along the first lateral direction of the appendage between a root that attaches the first appendage to the first joining member and an opposite end of the first appendage.

10. The robotic device, according to claim 7, wherein the second appendage further includes a second linkage, and the second appendage extends in a second direction having a second angle to the second linkage.

11. The robotic device, according to claim 10, wherein a linkage angle between the first linkage and the second linkage of the second assembly is established absent the command to the actuator.

12. The robotic device, according to claim 7, further comprising:
a torsion actuator that rotates the first appendage, wherein the first appendage extends radially to form a rim having a radius from the first joining member, and the radius varies angularly along the first lateral direction of the first appendage.

13. A method for controlling a robotic device having a plurality of concatenated assemblies, the method comprising:
fixedly connecting a linkage to a joining member of an assembly of the concatenated assemblies;
extending an appendage from the joining member along at least a lateral direction having a specified angle to the linkage;
attaching a connector to the appendage of at least one of the concatenated assemblies, wherein the connector is adjustably disposable along the at least one lateral direction of the appendage to a position thereon;
pivotably connecting the linkage to an adjacent joining member of an adjacent assembly of the concatenated assemblies;
connecting a tendon to slide through the connector corresponding to at least one appendage of the plurality of concatenated assemblies; and
pulling the tendon by an actuator in response to a command.

14. The method, according to claim 13, further comprising:
adjusting the position of the connector along the at least one lateral direction by an auxiliary actuator.

15. The method, according to claim 14, wherein adjusting the position by the auxiliary actuator further includes translating the connector along the at least one lateral direction of the appendage between a root that attaches the appendage to the joining member and an opposite end of the appendage.

16. The method, according to claim 13, further comprising:
establishing a linkage angle between the linkage and an adjacent linkage of the adjacent assembly, the linkage angle being adjustable in response to the command to the actuator.

17. The method, according to claim 13, further comprising:
extending the appendage radially from the joining member to form a rim having a radius from the joining member that angularly varies; and
rotating the first appendage around the first joining member.

* * * * *